US010051324B2

(12) United States Patent
Biewer et al.

(10) Patent No.: US 10,051,324 B2
(45) Date of Patent: Aug. 14, 2018

(54) APPARATUS AND METHOD FOR PROVIDING A JOINT IP DATA-STREAM

(71) Applicant: MX1 GmbH, Unterfoehring (DE)

(72) Inventors: Patrick Biewer, Gonderange (LU); Fabio Lattanzi, Luxembourg (LU)

(73) Assignee: MX1 GmbH, Unterföhring (DE)

( * ) Notice: Subject to any disclaimer, the term of this patent is extended or adjusted under 35 U.S.C. 154(b) by 0 days.

(21) Appl. No.: 14/420,958

(22) PCT Filed: Aug. 21, 2013

(86) PCT No.: PCT/EP2013/067406
§ 371 (c)(1),
(2) Date: Feb. 11, 2015

(87) PCT Pub. No.: WO2014/029817
PCT Pub. Date: Feb. 27, 2014

(65) Prior Publication Data
US 2015/0264437 A1    Sep. 17, 2015

(30) Foreign Application Priority Data

Aug. 24, 2012  (EP) ..................................... 12181654

(51) Int. Cl.
*H04N 7/20*     (2006.01)
*H04N 21/462*   (2011.01)
(Continued)

(52) U.S. Cl.
CPC ..... *H04N 21/4622* (2013.01); *H04N 21/4263* (2013.01); *H04N 21/4383* (2013.01);
(Continued)

(58) Field of Classification Search
CPC ......... H04N 21/6125; H04N 21/23106; H04N 21/222; H04N 7/17318; H04N 21/25891; H04N 21/64
(Continued)

(56) References Cited

U.S. PATENT DOCUMENTS 6,834,039 B1 * 12/2004 Kelly ................... H01Q 1/1257
                                                         370/229
7,992,175 B2 *  8/2011 Kahn ..................... H04N 7/162
                                                          725/100
(Continued)

FOREIGN PATENT DOCUMENTS

WO       WO 0180452 A1    10/2001

OTHER PUBLICATIONS https://en.wikipedia.org/wiki/DVB-S2.*
(Continued)

*Primary Examiner* — Fred Peng
(74) *Attorney, Agent, or Firm* — Meyertons Hood Kivlin Kowert & Goetzel, P.C.; Jeffrey C. Hood

(57) ABSTRACT

The present invention refers to an apparatus for providing at least one joint outgoing IP data stream, the apparatus comprises: (a) at least one receiver adapted to receive a stream of digital TV data, the stream simultaneously containing digital data of a plurality of TV channels, (b) at least one transceiver adapted to receive a downlink stream of IP data and to transmit an uplink stream of IP data via a satellite link, (c) at least one processing unit adapted to convert the digital TV data received from the receiver into a first outgoing IP data stream and to convert the IP data received from the transceiver into a second outgoing IP data stream, and (d) at least one switching unit adapted to combine the first outgoing IP data stream and the second outgoing IP data stream in at least one joint outgoing IP data stream.

12 Claims, 10 Drawing Sheets

Figure 1:
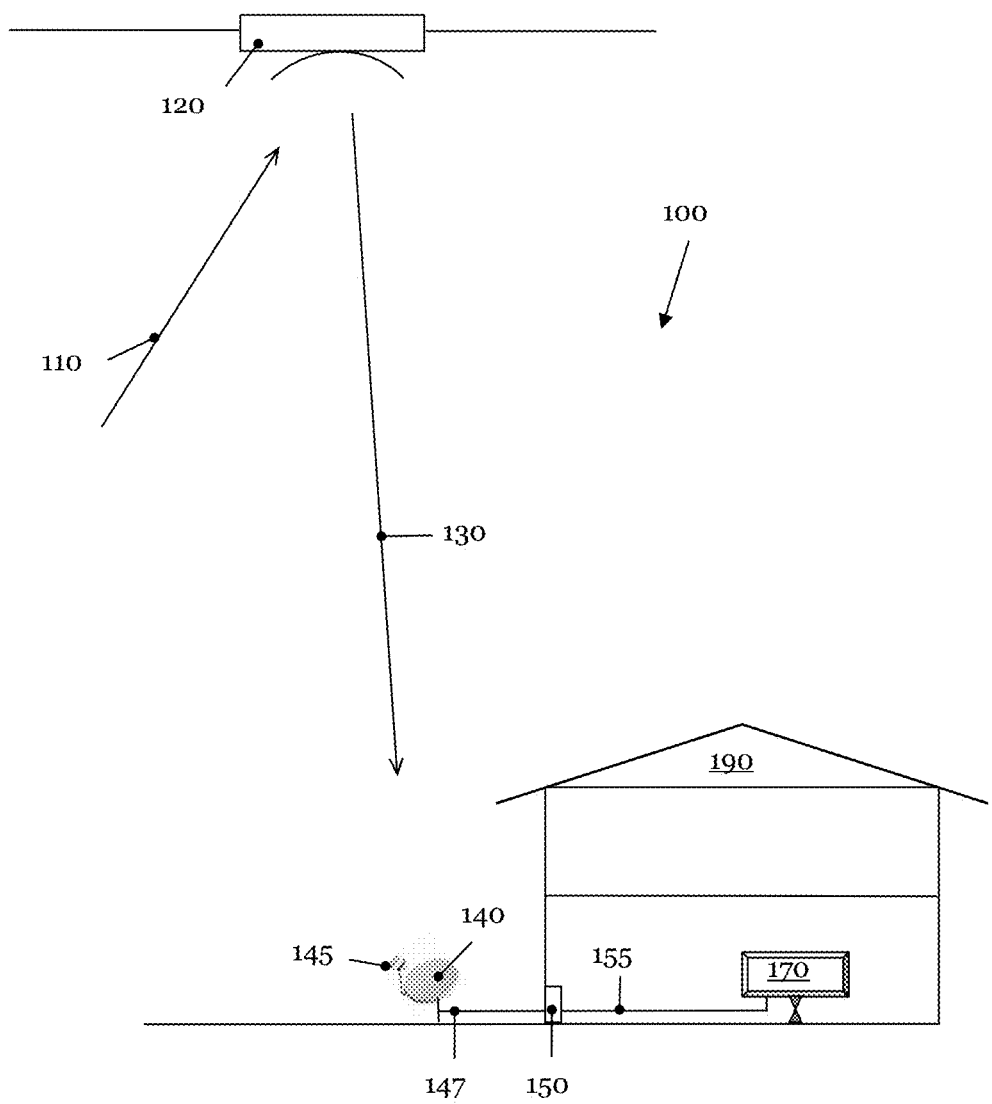

(51) Int. Cl.
*H04N 21/61* (2011.01)
*H04N 21/643* (2011.01)
*H04N 21/426* (2011.01)
*H04N 21/438* (2011.01)
*H04N 21/4402* (2011.01)

(52) U.S. Cl.
CPC ..... *H04N 21/4402* (2013.01); *H04N 21/6143* (2013.01); *H04N 21/6193* (2013.01); *H04N 21/64322* (2013.01)

(58) Field of Classification Search
USPC ...................................................... 725/63–72
See application file for complete search history.

(56) References Cited

U.S. PATENT DOCUMENTS

| | | | | |
|---|---|---|---|---|
| 2001/0045906 | A1* | 11/2001 | Kelly | H01Q 1/1257 342/359 |
| 2003/0196205 | A1* | 10/2003 | Chiu | H04L 29/06 725/64 |
| 2004/0033780 | A1* | 2/2004 | Kelly | H04B 7/18519 455/11.1 |
| 2007/0115195 | A1* | 5/2007 | Locatori | H01Q 19/17 343/781 CA |
| 2008/0168523 | A1* | 7/2008 | Ansari | G06Q 30/04 725/131 |
| 2010/0138885 | A1* | 6/2010 | Haimi-Cohen | H04N 21/234327 725/109 |
| 2013/0149958 | A1* | 6/2013 | Davis | H04B 7/18523 455/12.1 |
| 2015/0264437 | A1* | 9/2015 | Biewer | H04N 21/4622 725/64 |

OTHER PUBLICATIONS

SES; "SES unveils IP-based in-home distribution of satellite TV signals"; www.SES.com; Apr. 27, 2012; XP002693870; URL:http://www.ses.com/4233325/news/2012/11403011 [retrieved from the internet on Mar. 15, 2013]; one page.

Johansson—ProStreamer (IPTV)—Technology; Jul. 11, 2012; XP002693869; URL:http://web.archive.org/web/20120711221118/http://www.johansson.be/en/products/MDU/DMH/IP/technology.html? [retrieved from the internet on Mar. 15, 2013]; one page.

\* cited by examiner

APPARATUS AND METHOD FOR PROVIDING A JOINT IP DATA-STREAM

1. FIELD OF THE INVENTION

The present invention relates to the field of providing a joint IP data stream.

2. BACKGROUND OF THE INVENTION

Television (TV) content can be broadcasted to users using several different transmission technologies. Similar to audio broadcast, TV signals have been initially broadcasted by means of terrestrial towers. This technology has bandwidth limitations restricting the number of TV channels which can be provided to the user. Another technology used for the distribution of TV content is the transmission via cables, in particular by coaxial cables. The usage of a coaxial cable as a transport medium for TV signals enables the provision of more TV channels than the broadcast by terrestrial towers. On the other hand, the provision of TV content via cable is expensive in particular if the cable has to be dug into the earth. Therefore, in the last two decades mass distribution of TV content has been mainly driven the broadcasting of TV content by satellites, which is called direct broadcast satellite (DBS), or more generally direct-to-home (DTH) television. Originally, the TV content has been exclusively broadcasted by analogue transmission. In recent years, there is a clear trend to digital transmission of TV content irrespective of the used technology.

Further entire families of standards have been developed and widely adopted by the industry over the years with the objective of optimising the utilisation of various transmission channels, combining services and addressing specific customer requests. In the meantime, the developed technology enables a portfolio of services that spans from free-to-air (FTA) and pay-TV bouquets based on conditional access as well as on demand contents as for example Internet protocol television (IPTV).

In parallel, Internet access is nowadays provided by various different channels. Wired access uses optical fibres for the provision of huge data rates as for example for large enterprises. Coaxial cables can also transmit large data rates. However, they are often only available in densely populated urban areas as their installation is time-consuming and expensive. Further, the twisted pair cables originally designed as transport medium for circuit switched analogue telephone calls can also be used to provide Internet access by applying the digital subscriber line (DSL) technology. As a consequence of their design, twisted pair cables can only supply limited transmission rates across a restricted distance.

Moreover, in recent years, wireless Internet access has become popular in densely populated areas which have the required wireless network infrastructure. Wireless Internet access technologies are for example Wireless Fidelity (WiFi), Wireless Interoperability for Microwave Access (WIMAX), Long Term Evolution (LTE), Global System for Mobile communication (GSM) or Universal Mobile Telecommunications System (UMTS).

On the other hand, it is time consuming and expensive to install both a wired and a wireless access system. Therefore, if ever, the infrastructure provision of rural areas will be very slow.

Conversely, in contrast to twisted pair cables, a satellite link having an uplink capability can provide a high data rate Internet access. Very Small Aperture Terminals (VSAT) available in the market enable the establishment of an uplink channel to a satellite. As a consequence, a satellite can provide TV content as well as Internet data to a user. This solution may be the only high data rate Internet access in rural areas.

For this solution, the user needs apart from an antenna, a receiver for the TV data, a transceiver for the Internet data, at least two cables from the antenna into his house, and at least two different cables within his house, a first one to transmit the received TV data to the TV set and at one second cable for the transmission of the Internet data between the antenna and the computer system. Moreover, in many households there are nowadays more than one TV set and more than one computer. Thus, the set-up and the maintenance of such a solution require some effort.

It is therefore one object of the present invention to provide an apparatus and a method for providing TV content and Internet content via a satellite link which avoids at least some of the drawbacks mentioned above.

3. SUMMARY OF THE INVENTION

According to a first aspect of the invention, an apparatus according to claim 1 is provided. In an embodiment, the apparatus for providing at least one joint outgoing IP data stream comprises (a) at least one receiver adapted to receive a stream of digital TV data, the stream simultaneously containing digital data of a plurality of TV channels, (b) at least one transceiver adapted to receive a downlink stream of IP data and to transmit an uplink stream of IP data via a satellite link, (c) at least one processing unit adapted to convert the digital TV data received from the receiver into a first outgoing IP data stream and to convert the IP data received from the transceiver into a second outgoing IP data stream; and (d) at least one switching unit adapted to combine the first outgoing IP data stream and the second outgoing IP data stream in at least one joint outgoing IP data stream.

The inventive apparatus combines a receiver, a transceiver, a processing unit and a switching unit to a configuration which allows combining TV content of one or several TV channels and Internet content in a single IP data stream. In contrast to the present situation, TV content and Internet content appear at the output of the apparatus in a uniform data format. Thus, the inventive apparatus avoids a doubling of the cabling within a building.

Furthermore, the defined apparatus provides TV content or TV channels to almost every computer system. In parallel, a user can have access to the Internet. Consequently, the inventive apparatus combines the TV content distribution with the interactivity of the Internet at the output of a single terminal device having a single data connection.

In case the TV content and the Internet content is provided by a single satellite, a single antenna or more specifically one VSAT can be used for the reception of TV content and transmission of the Internet content, i.e. for performing Internet traffic. Internet content means content requested by a user and obtained from the Internet. Such a solution does not only have a visual effect with respect to the optic of a house or a building, but does also have an economical effect. Moreover, similar to the output side of the apparatus also its input side receives requests for TV content and Internet content by means of a single data source. Thus, an inventive apparatus provides a simple solution for a parallel provision of a large number of TV channels and a high data rate Internet access.

In a further aspect, the first outgoing IP data stream comprises digital data of at least one TV channel.

In case the first outgoing IP data stream comprises one TV channel, the processing unit generates the first outgoing IP data stream containing digital data of the TV channel. In case there already exists a first outgoing IP data stream comprising digital data of one or several TV channels, the request for the digital data of a further specific TV channel modifies, i.e. enhances the existing first outgoing IP data stream by digital data of the selected TV channel, and thus also changes the outgoing joint IP data stream.

In another favourable aspect, the switching unit is further adapted to split a joint incoming IP data stream into a first incoming IP data stream and a second incoming IP data stream.

According to a further aspect, the processing unit is further adapted to convert the second incoming IP data stream into IP data to be transmitted by the transceiver.

The separation of the incoming joint IP data stream in a first incoming IP data stream and a second incoming IP data stream occurs on the basis of the IP address of a data packet within the joint incoming IP data stream. Consequently, the defined apparatus, in particular its processing unit comprises preferably at least two IP addresses.

In still an another aspect, the processing unit is further adapted to generate or modify the first outgoing IP data stream in response to a first incoming IP data stream requesting digital data of a selected TV channel.

A request for digital data of a selected TV channel by a user of a TV set or a computer system generates at the output of the above defined apparatus a joint incoming IP data stream. The switching unit routes the joint incoming IP data stream comprising the request for digital data of a selected TV channel as a first incoming IP data stream to the processing unit. The processing unit selects digital data of the selected TV channel from the digital TV data obtained from the receiver. Then, the processing unit generates a first outgoing IP data stream containing the digital data of the selected TV channel, or adds the digital data of the selected TV channel to an already existing first outgoing IP data stream.

In a beneficial aspect, the processing unit converts digital data of the selected TV channel into the first outgoing IP data stream by using a Sat-IP protocol.

The Sat-IP protocol also designated as SAT>IP protocol converts by means of a processing unit the TV contents delivered via a satellite link into an IP data stream accessible by all IP enabled devices equipped with the respective client software. In Germany approximately 50% of the households receive their TV programs via satellite. If the Sat-IP protocol establishes in the market, it will strongly enhance the number of terminals which can be used to view TV content. In addition, the Sat-IP protocol in combination with respective client software may pave the way for a further integration between the media industry and the broadband industry by means of a new set of integrated products and services based on the common IP foundations.

In another beneficial aspect, the receiver comprises a tuner bank adapted to simultaneously select digital data of several selected TV channels from several transport streams comprising digital TV data.

A low-noise block down-converter (LNB) which is part of the receiver provides digital data of many TV channels received from a satellite link to a radio frequency (RF) front end of the receiver. A single tuner which is part of the RF front end receives one carrier signal or one transport stream (TS) which can carry or transport many compressed TV channels. The number of compressed TV channels within a transport stream depends on the type of channel under consideration (as for example standard definition (SD) or high definition (HD) television). Consequently, an RF front end of a receiver comprising a tuner bank can simultaneously select digital data of several transport streams received from the satellite. The number of parallel tuners in the tuner bank determines the maximum number of transport streams for which the receiver can simultaneously detect digital data of TV channels. Thus, the maximum number of TV channels which can be provided in the first outgoing data stream is given by the sum of the number of compressed TV channels contained in the individual transport streams detected by the number of parallel tuners of the tuner bank.

In a further aspect, the stream of digital TV data comprises direct-to-home TV signals and the receiver comprises a low-noise block down-converter (LNB), and a first radio frequency (RF) front end, wherein the radio frequency front end receives digital TV data from a low-noise block down-converter, and wherein the transceiver comprises a low-noise block down-converter, a block up-converter (BUC), and a second radio frequency front end, wherein the block up-converter transmits the uplink stream of IP data by a transmission feed horn.

The defined apparatus is designed to use whenever possible conventional devices on its input side, i.e. for its receiver and its transmitter. This approach is best suited for a rapid deployment of the above described apparatus as already existing equipment can be used to a large extent. Furthermore, it secures that the defined apparatus can operate with the equipment of all standard conforming equipment manufacturers.

According to another aspect, the receiver receives at least one first TV channel from a first antenna and at least one second TV channel from a second antenna, and the transceiver receives IP data from the first antenna and/or from the second antenna and transmits IP data via to the first antenna or the second antenna.

This configuration is necessary if a user wants to obtain data provided by two different satellites having different orbit positions.

In still a further beneficial aspect, the receiver and the transceiver have a joint antenna with combined feeds for receiving TV and IP data and the transceiver has a separate feed for transmitting IP data.

The usage of a single antenna is the preferred configuration as it is a cost-effective solution.

At the moment, there is a limitation of a joint antenna concept as the bandwidth of present LNBs and/or BUCs is limited. This may change for future LNBs and/or BUCs having larger bandwidths. Thus, in order to receive data from two different frequency bands provided by a satellite, two LNBs are currently necessary for receiving TV content in a first band and IP content in a second band. It is conceivable to use two LNBs for a single antenna, but this leads to a mechanically involved construction. Therefore, it is presently preferred to apply two antennas each having its own LNB and/or BUC for the simultaneous detection of TV and IP data from two different frequency bands of the satellite.

This means that the antenna and the RF front end of the defined apparatus can be realized depending on the progress or on the kind of construction of the LNB and BUC, i.e. having one or more intermediate frequency outputs or inputs, respectively. The apparatus defined above is neither restricted to conventional VSAT LNB/BUC arrangements nor to conventional TV LNBs regardless of their construction. Rather, the defined apparatus can be applied to generate a joint outgoing IP data stream from digital TV data and IP data irrespective of the specific design of its receiver and transmitter.

According to another aspect, the receiver and the transceiver simultaneously operate and the processing unit is further adapted to simultaneously receive digital TV data, to receive and transmit IP data and to generate the first and the second outgoing IP data streams and to receive the first and the second incoming IP data streams.

The above described apparatus is able to simultaneously receive digital TV data of many TV channels, to select digital data of one or several TV channels, and to provide Internet access from one or several computer systems. Further, the function of the apparatus may be scaled depending on the intended installation location. For example, the apparatus may be designed to simultaneously provide digital data of several TV channels from a single transport stream for the supply of a house. On the other hand, the apparatus may be constructed to simultaneously provide many (e.g. hundred) TV channels from a number of transport streams for the supply of a multi-dwelling building. Therefore, the apparatus defined above can act as a home gateway, but it can also be operated as a multi-dwelling shared access gateway.

In a further aspect, the IP data comprise voice data.

Apart from Internet content, the IP data received from a satellite and transmitted to the satellite can contain voice data. Therefore, the inventive apparatus defined above allows flexibly providing multimedia services. The voice data contained in the IP data enable the provision of any kind of telephony service as for example conventional telephony, video telephony, teleconferencing, etc. As a consequence, the defined apparatus permits the provision of triple play services.

Similar to voice over IP (VoIP) over wired links, VoIP transmitted via satellite may also use all standards and protocols developed to secure quality of service (QoS) for the transmission of voice data packets in a packet switched network.

In still another favourable aspect, the above defined apparatus further comprises a distribution unit adapted to transmit the at least one joint outgoing IP data stream and to receive the at least one joint incoming IP data stream by means of a wired link and/or by a wireless link.

By adding a distribution unit to the defined apparatus, it can be handled like a backbone of a so called 'Last Mile' hub which can serve many users with a fast Internet access and additionally providing plenty of TV channels to the users.

In yet another aspect, the wired link comprises twisted pair cables fed by a digital subscriber line access multiplexer (DSLAM) variant and/or a coaxial cable and/or an optical fibre, and wherein the wireless link comprises a wireless local area network (WLAN) operating according to one of the standards Wireless Fidelity, Wireless Interoperability of Microwave Access, and/or Long Term Evolution and/or a radio link.

The distribution unit can be adapted so that it can transmit data in all networks irrespective if they are wireless or wired which are capable to transmit the joint outgoing IP data stream. Therefore, the defined apparatus allows a user to autonomously manage the access to various networks providing different services.

According to a further aspect, a method for providing at least one joint outgoing IP data stream comprises the steps: (a) receiving a stream of digital TV data by at least one receiver, the stream simultaneously containing digital data of a plurality of TV channels, (b) receiving a downlink stream of IP data and transmitting an uplink stream of IP data via a satellite link by at least one transceiver, (c) converting the digital TV data received from the receiver into a first outgoing IP data stream by at least one processing unit and converting the IP data received from the transceiver into a second outgoing IP data stream by the at least one processing unit, and (d) combining the first outgoing IP data stream and the second outgoing IP data stream in at least one joint outgoing IP data stream by at least one switching unit.

In still a further beneficial aspect, the method further comprises the steps: (a) requesting digital data of a selected digital TV channel by generating a joint incoming IP data stream, (b) routing the joint incoming IP data stream as first incoming IP data stream to the processing unit by the switching unit, (c) selecting digital data for the selected TV channel from the plurality of TV channels by the processing unit, and (d) generating or modifying the first outgoing IP data stream comprising digital data of the selected TV channel by the processing unit.

According to still another favourable aspect, the method further comprises the steps: (a) requesting digital data of a selected website by generating a joint incoming IP data stream, (b) routing the joint incoming IP data stream as second incoming IP data stream to the processing unit by the switching unit, (c) routing the second incoming IP data stream by means of the transceiver to the website, and (d) generating or modifying the second outgoing IP data stream comprising requested digital data provided by the selected website by the processing unit.

4. DESCRIPTION OF THE DRAWINGS

In order to better understand the present invention and to appreciate its practical applications, the following figures are provided and referenced hereafter. It should be noted that the figures are given as examples only and in no way limit the scope of the invention.

Figure 2:
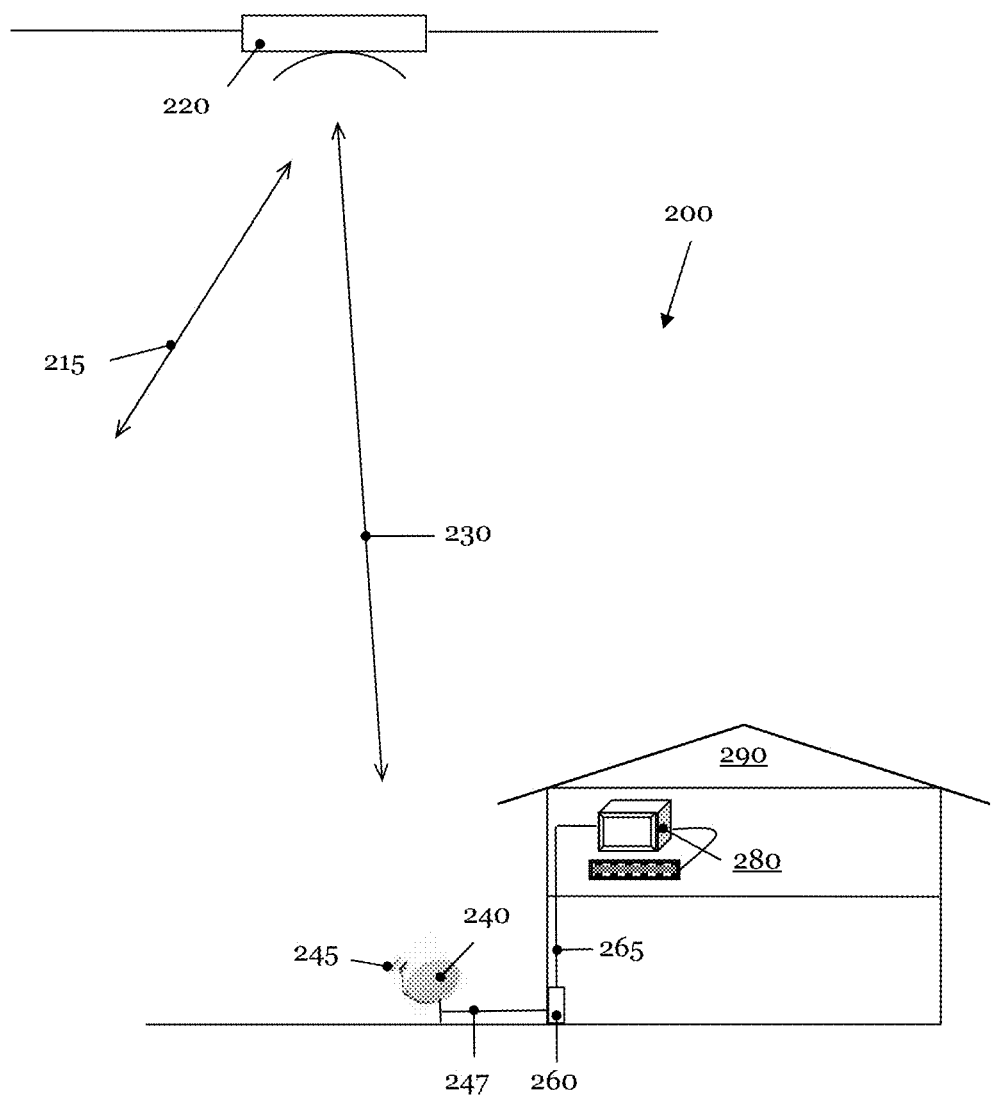
Figure 3:
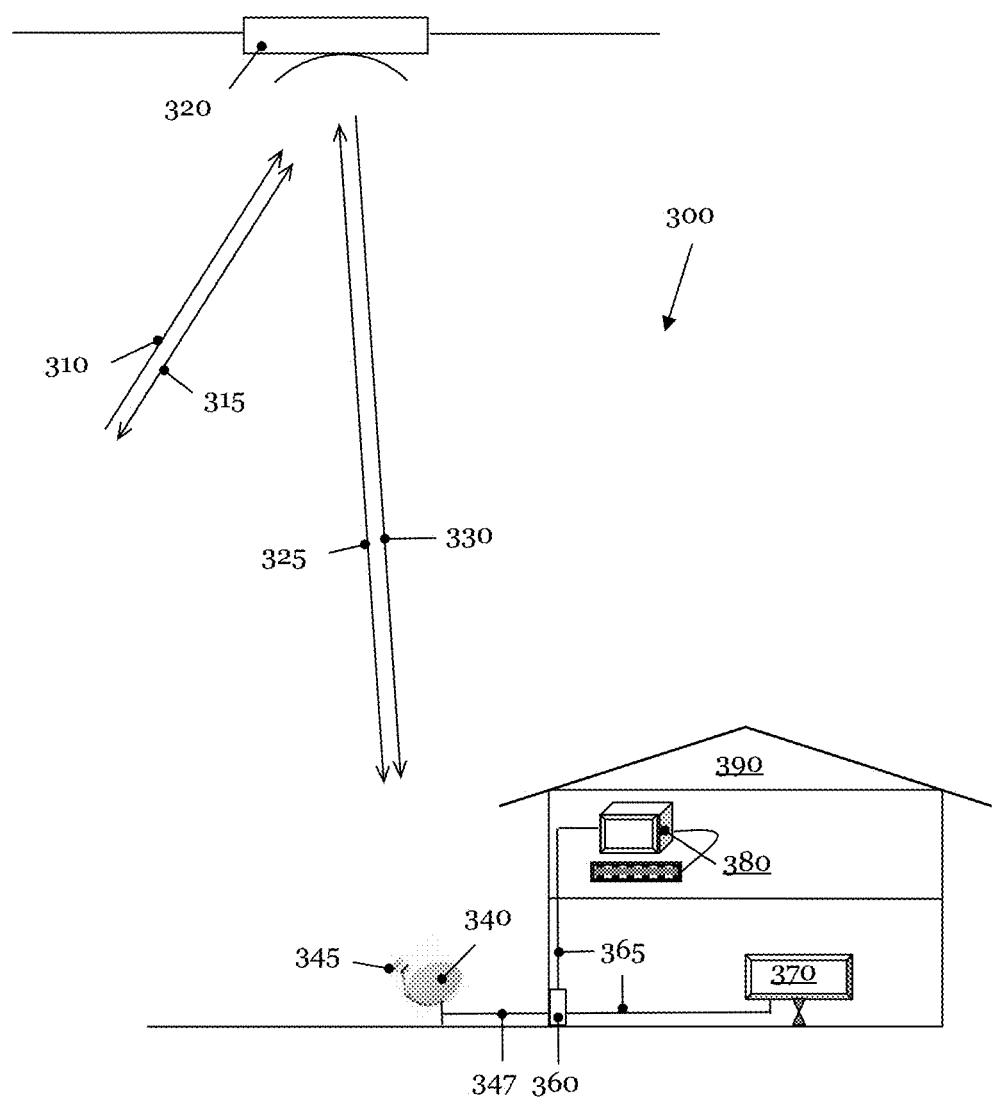
Figure 4:
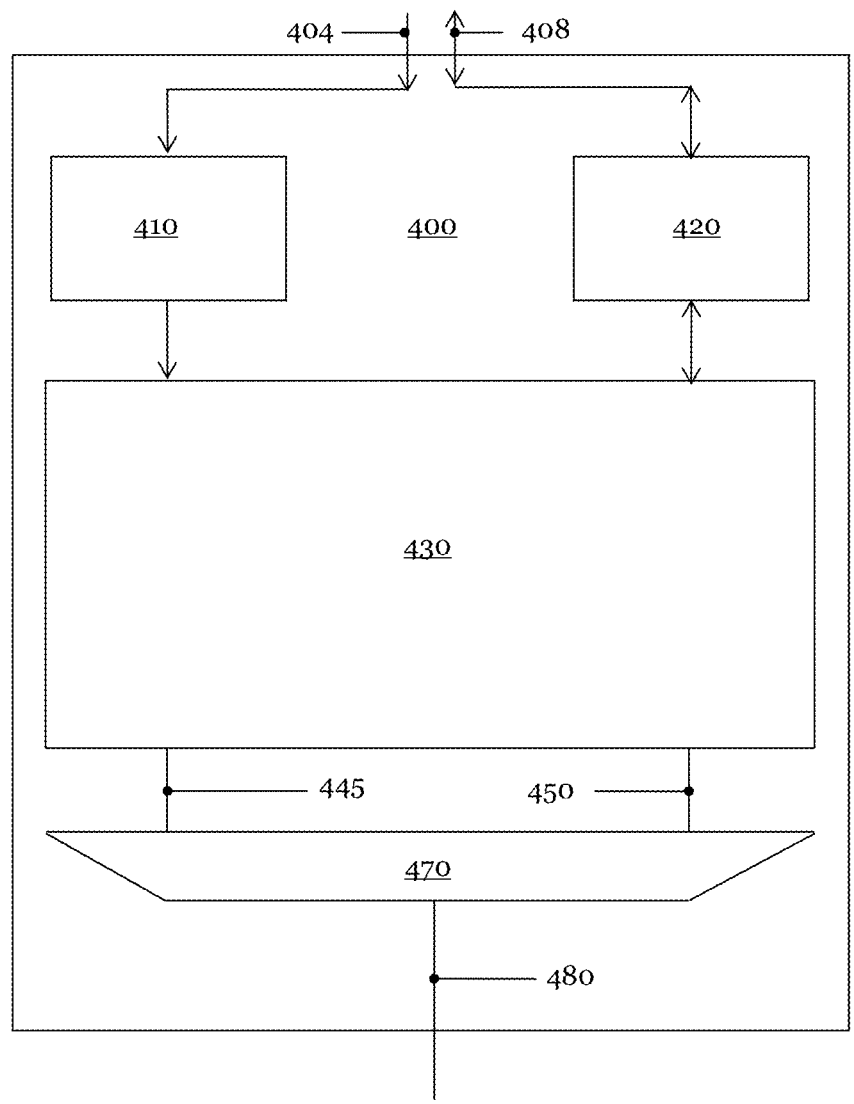
Figure 5:
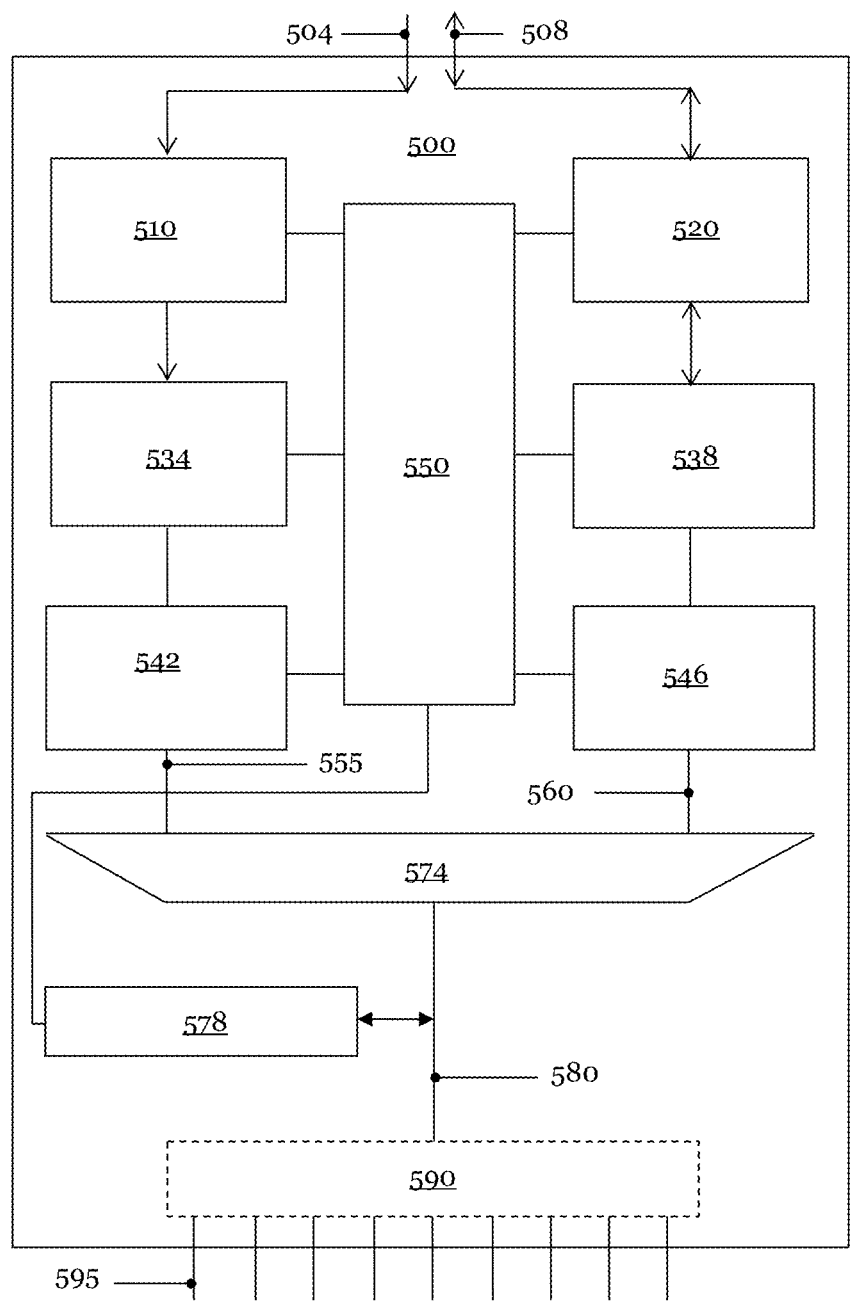
Figure 6:
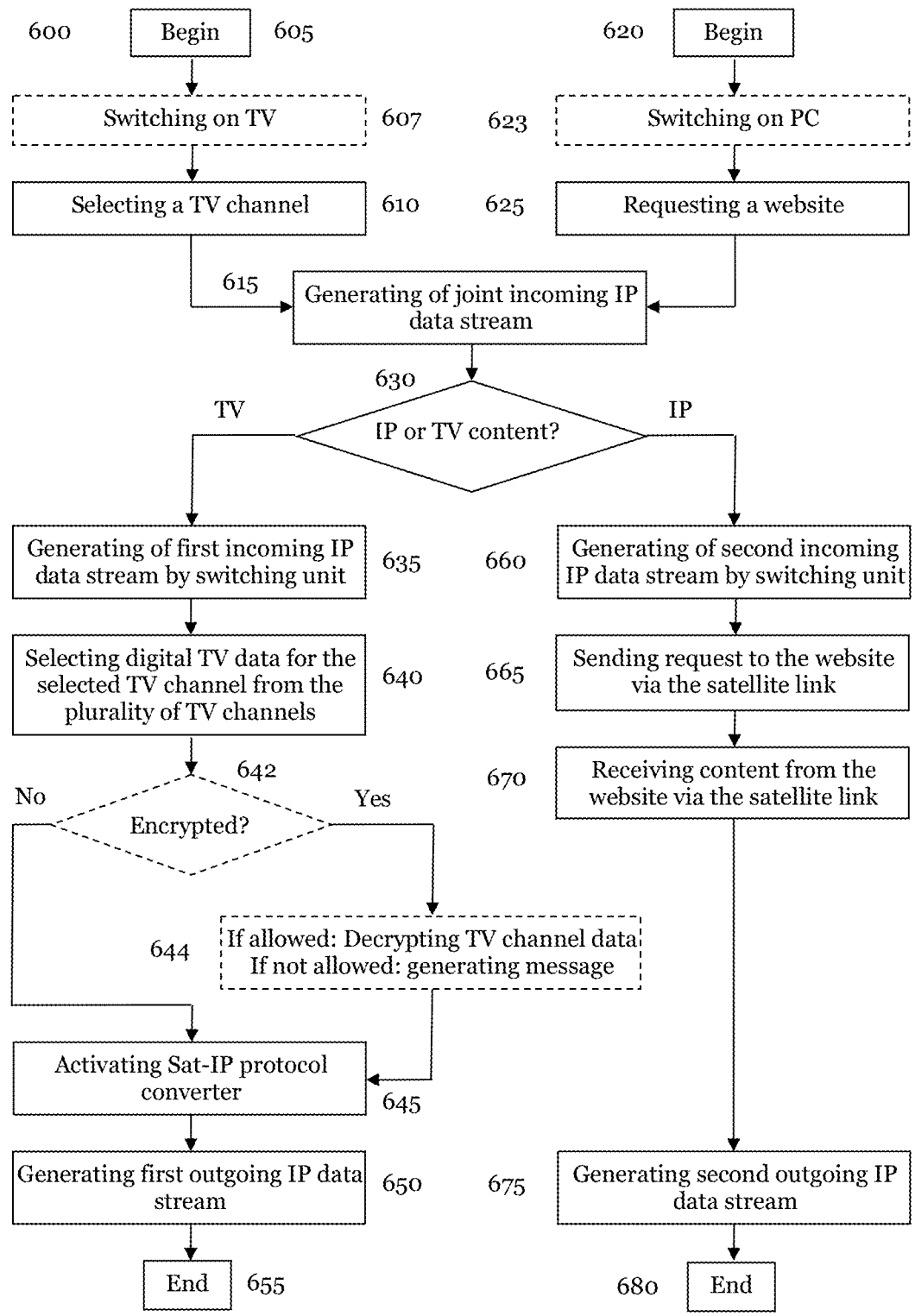
Figure 7:
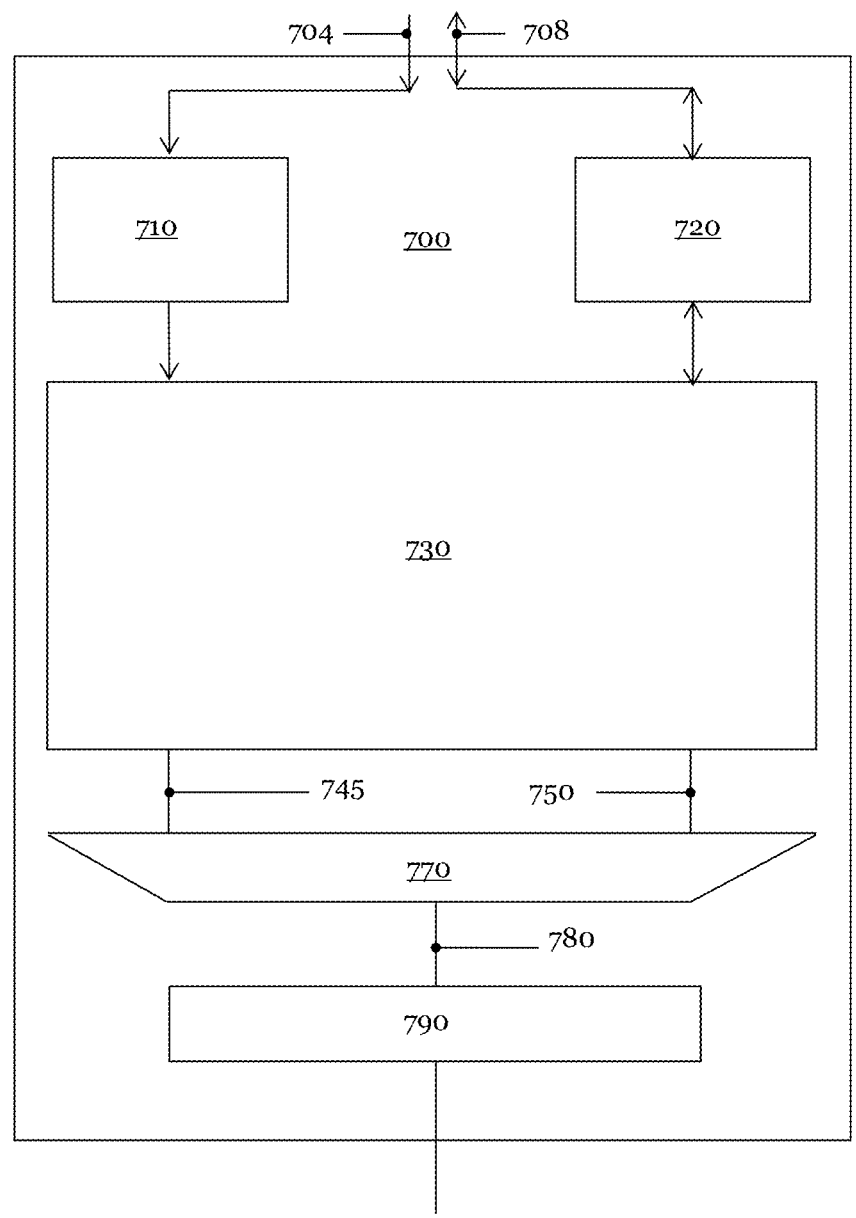
Figure 8:
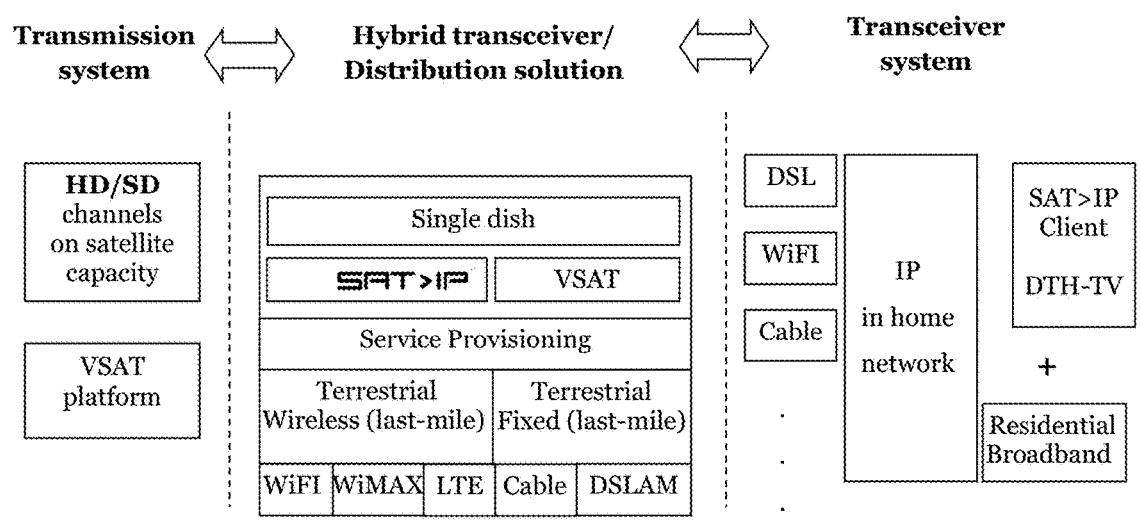
Figure 9:
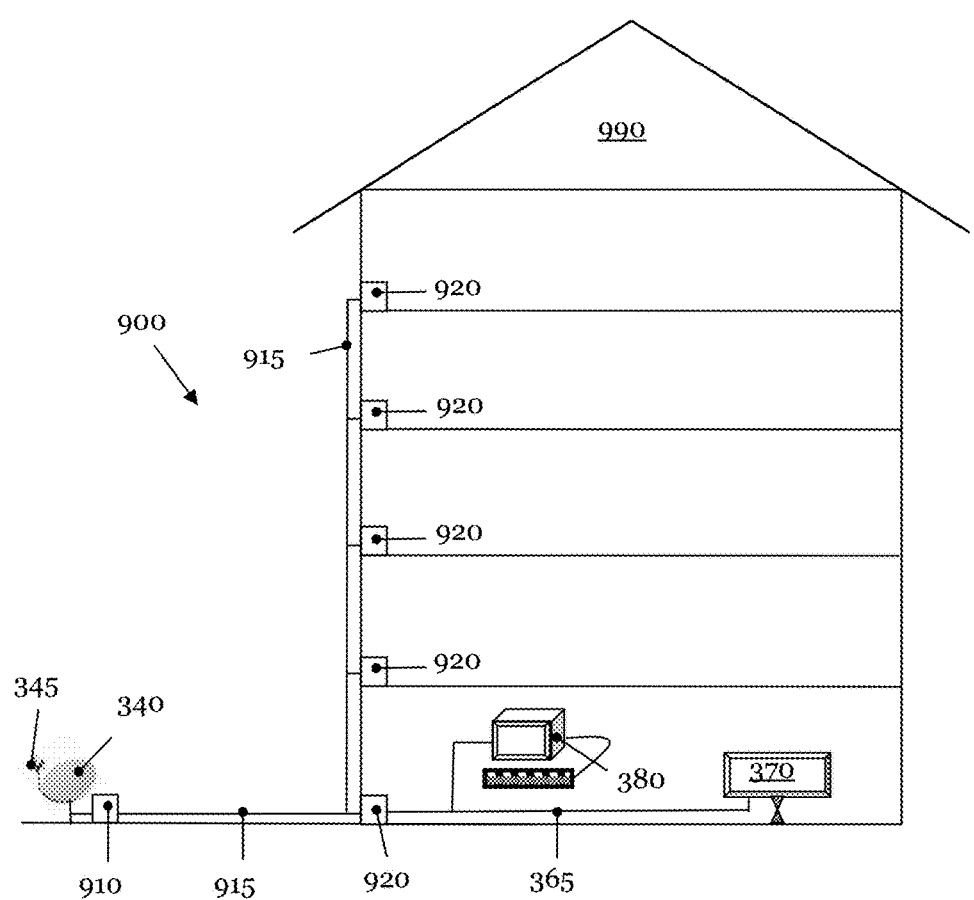
Figure 10:
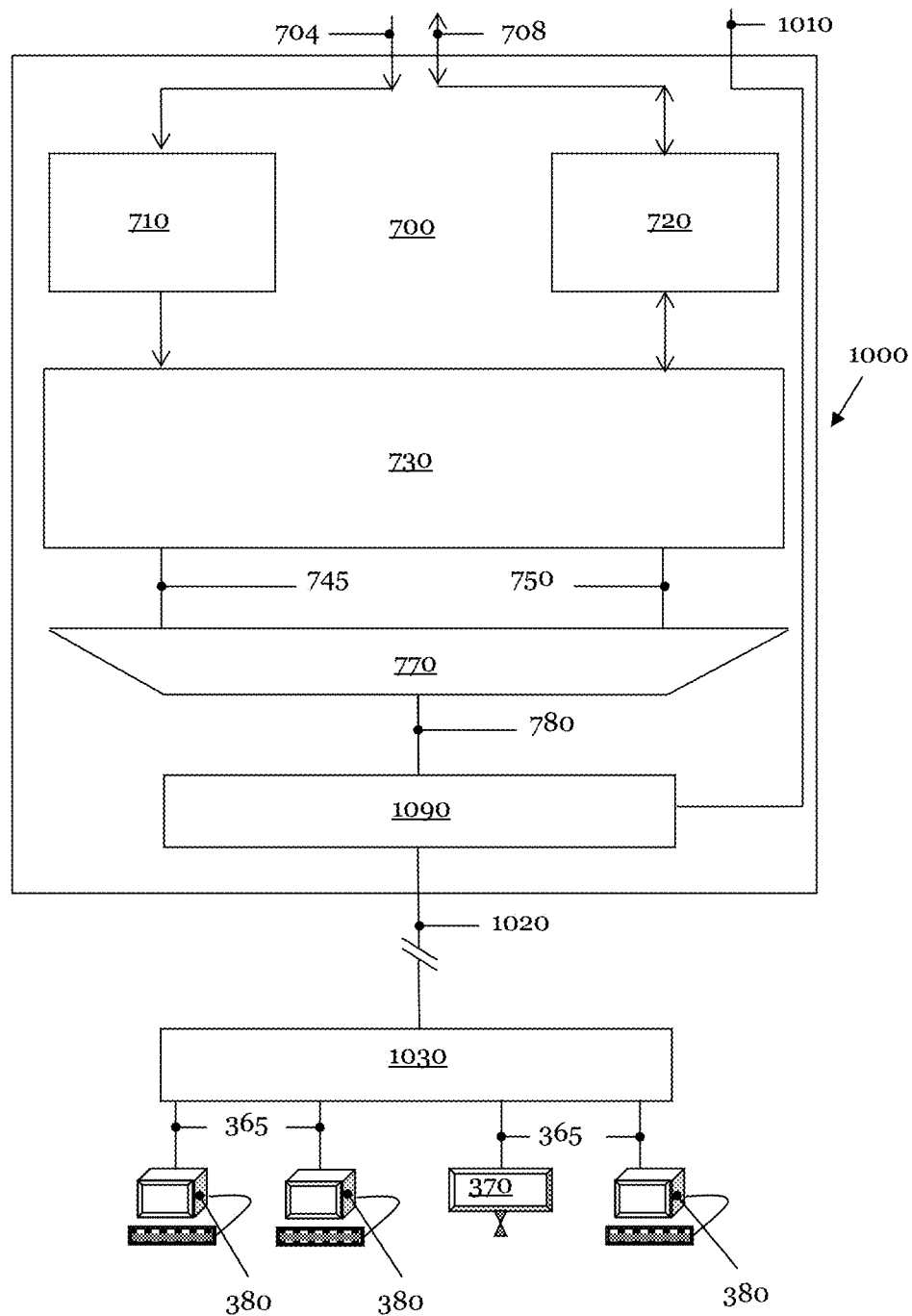

FIG. 1 schematically shows some important components of a direct-to-home (DTH) TV system;

FIG. 2 schematically depicts some important components of an Internet access system using a satellite link;

FIG. 3 schematically represents some important components of a satellite link simultaneously providing TV content and Internet content by means of a single antenna and a combined receiver and transceiver providing TV content and Internet content in a single format;

FIG. 4 schematically illustrates a high level view of a crossover box providing a single IP data stream containing digital data of TV channels and IP data downloaded from the Internet;

FIG. 5 schematically presents one embodiment of the crossover box of FIG. 4 in some detail;

FIG. 6 shows a flowchart of handling requests for TV programs and Internet access by the crossover box of FIG. 4;

FIG. 7 schematically illustrates a second embodiment of the crossover box of FIG. 4 additionally having a distribution unit resulting in a 'Last Mile' hub of the crossover box;

FIG. 8 schematically presents an overview of some exemplary technologies used by the distribution unit of FIG. 7 to bridge the last line to customer premises;

FIG. 9 schematically illustrates an embodiment of the crossover box acting in combination with a distribution unit as a multi-dwelling shared access gateway; and FIG. 10 schematically shows a hybrid transceiver and distribution system comprising a digital subscriber line access multiplexer (DSLAM) as a distribution unit which acts as a head-end shared access gateway.

5. DETAILED DESCRIPTION OF PREFERRED EMBODIMENTS

In the following, the present invention will now be described in more detail hereinafter with reference to the accompanying figures, in which exemplary embodiments of the invention are illustrated. However, the present invention may be embodied in different forms and should not be construed as limited to the embodiments set forth herein. Rather, these embodiments are provided so that this disclosure will be thorough and will convey the scope of the invention to persons skilled in the art.

FIG. 1 schematically shows some components of a direct broadcast satellite (DBS) television system or more generally of a direct-to-home (DTH) satellite television system 100 according to the prior art. An uplink station (not shown in FIG. 1) transmits TV content modulated on a microwave carrier frequency no to a geostationary satellite 120. Uplink frequency bands comprise for example the frequency bands 12.75-13.25 GHz, 13.75-14.5 GHz and 17.3-18.1 GHz ($K_u$ band). The $K_a$ band (27-40 GHz) may also be used in future DTH satellite systems.

It is in the following assumed that the TV data are digitally coded according to the digital video broadcasting satellite (DVB-S) or the DVB-S2 standards. However, an inventive apparatus and an inventive method to be discussed in the following can also be applied to satellite links transmitting analogue TV signals as well as to satellite links using future modulation standards. Furthermore, the DTH satellite link can transmit TV channels in the standard definition (SD) format as well as high definition TV (HDTV) channels.

Typically, the satellite 120 transmits the digital TV data also on a microwave carrier frequency 130 down to earth. The downlink frequency band comprises the frequency range of 10.70 to 12.75 GHz. The apparatus explained in the following can be also applied to satellite TV systems using other frequency bands suitable for the establishment of a satellite link, as for example the C-band (3.4-4.2 GHz).

A dish antenna 140 or a parabolic antenna 140 collects a small portion of the signal 130 transmitted by the satellite 120 and focuses the collected signal on a low-noise block down-converter (LNB) 145 arranged in the focus of the parabolic satellite dish antenna 140. Thus, the LNB 145 acts as the receiving device of the dish antenna 140. The LNB 145 comprises a low-noise amplifier (LNA), a block down-converter which generates an intermediate frequency (IF) signal, for example in the frequency band of 950 to 1950 MHz. The LNB 145 further comprises an amplifier for amplifying the IF signal. If, for example, the LNB 145 is a device with four output lines (low band, horizontal and vertical polarization and high band, both polarizations as well), which is called a quattro type LNB, it can present the whole satellite band to the indoor unit 150 which in case of a conventional set top box selects one of the four lines by a switch (not shown in FIG. 1).

A crossover box which will be discussed below can select one or more carriers or transport streams to further process their content(s). Up to now, it is not feasible to output the carriers or the transport streams of all four output lines on a single line since this would require four times the bandwidth and another IF. However, the LNB 145 is capable simultaneously presenting digital TV data of all TV channels contained in a received transport stream to the indoor unit 150. The LNB 145 may output the IF signals of the four frequency bands on a single line or on several lines. The amplified IF signal is then transmitted to the indoor unit 150 typically by a coaxial cable 147.

The dish antenna 140-LNB 145 combination may be arranged on a roof of a house or building 190, can be attached to a wall of the house 190, or may be arranged in some distance to the house 190, as for example in a garden of the house 190. The indoor unit 150 filters from the multitude of TV channels contained in the IF signal of the LNB 145 the TV channel selected by a user, converts the signal to another IF, and prepares the TV signal for the transmission to the TV set 170 in a standardized format. The TV signal is transmitted by the indoor unit 150 at a standard IF frequency across a specific coaxial cable 155. In FIG. 1 it is assumed that the TV set 170 is prepared to demodulate the TV program from the IF frequency (e. g. an IP TV set). If this is not the case, a set-top box can be used to demodulate the digital TV data provided by the coaxial cable 155 in analogue TV data used by conventional TV sets (not shown in FIG. 1).

Since some time, the indoor unit 150 does typically no longer convert the TV signal into another IF, but the TV signal is transmitted as a baseband signal to the TV set. In this case, a HDMI (high definition multimedia interface) cable replaces the conventional coaxial cable 155.

FIG. 2 schematically represents some components of a system 200 which enables high data rate Internet access via a satellite link 230 according to the prior art. The reception path of FIG. 2 is similar as described in FIG. 1. This means that the reception for the Internet access can comprise all satellite bands if the applied LNB is a multi-band LNB.

In order to provide an uplink channel to the satellite 220, parallel to the LNB 145 of FIG. 1, a block up-converter (BUC) and a transmission feed horn are used in FIG. 2 in order to set-up an uplink connection 230 to the satellite 220. A very-small aperture terminal (VSAT) is a receiving and a transmitting device for the parabolic satellite dish antenna 240. Thus, a VSAT provides a two-way ground station, i.e. it can simultaneously transmit a signal 230 to the satellite 220 and can receive a signal from therefrom. The VSAT comprises an outdoor unit (ODU) 245 and an indoor unit (IDU) 260. The very-small aperture terminal is also commonly known as customer premises equipment (CPE).

The satellite 220 transmits the signal 230 received from the ODU 245 of the VSAT as signal 215 to a ground station (not depicted in FIG. 2) which enables broadband access to the Internet. Further, the ground station sends requested Internet data or Internet content as an IP data stream via the signal 215, the satellite 220 and the signal 230 to the ODU 245 of the VSAT. It is in the following assumed that Internet data or Internet content is provided in both the uplink and the downlink direction as an IP data stream. Similar to the satellite broadcast system 100 of FIG. 1, the VSAT is capable to receive IP based Internet signals from each satellite band by a tunable LNB of the VSAT as well as to transmit IP based signals via the return channel on a predetermined satellite band by means of the BUC and the transmission feed horn of the ODU 245 of the VSAT.

As already mentioned above, the detection path or downlink of the VSAT is similar to that of FIG. 1 discussed in the context of the LNB 145. The coaxial cable 247 directs the received signal containing the requested Internet or IP data at an IF frequency from the ODU 245 to the IDU 260 of the VSAT. The IDU 260 converts the signal received from the ODU 245 of the VSAT in an IP data stream and provides the IP data stream 265 to the computer system 280 requesting the Internet data.

FIG. 3 schematically illustrates an embodiment of the invention. The configuration 300 of FIG. 3 combines the satellite TV system 100 of FIG. 1 and the satellite Internet access system 200 of FIG. 2 in a single system 300. Therefore, the exemplary system 300 of FIG. 3 combines all the features explained at the discussion of FIGS. 1 and 2. In particular, the ODU 345 of the VSAT simultaneously receives a multitude of TV channels via the signal 330 contained in all four satellite bands. At the same time, the ODU 345 of the VSAT receives an IP data stream from the Internet and transmits an IP data into the Internet via the signal 325 in a predetermined satellite band. On the other hand, it is also possible to design a VSAT which only uses one or several dedicated frequency bands.

The ODU 345 of the VSAT supplies the two different output signals containing the TV data and the Internet data at two different lines at two different IF frequencies or at two different groups of lines to the IDU 360 of the VSAT depending of the type of applied LNB and BUC. FIG. 3 illustrates coaxial cables as well as both groups of cables by the single line 347. A first signal (at a first IF) contains digital data of the multitude of received TV channels. A second signal (at a second IF) comprises the requested IP data. The ODU 345 of the VSAT has a joint feed for the reception of a stream of IP data from the satellite 320 (downlink path) and for the transmission of the stream of IP data to the satellite 320 (uplink path). In an alternative approach the signals between the ODU 345 and the IDU 360 of the VSAT having different intermediate frequencies can be carried by a single coaxial cable. In this case a frequency filter is arranged at the input or in front of the IDU 360 in order to separate the IF signals carrying TV data and Internet data at different intermediate frequencies.

In an approach, both the TV data and the IP data are transmitted from the ODU 345 to the IDU 360 at the same IF and the IDU 360 distinguishes the data stream in a first signal containing the TV data and a second signal containing the IP data.

It is presently preferred to use separated cables for the reception and the transmission of data between the ODU 345 and the IDU 360 of the VSAT. It is however also conceivable to transport data between the ODU 345 and the IDU 360 in both direction through a single cable. Moreover, it is also conceivable to use an individual cable for each IP signal.

Alternatively, a first dish antenna may be used for the reception of the digital TV data and a second antenna can be applied for the transmission of the Internet data or IP data. The second antenna may have separate feeds for the reception and transmission paths, or may have a joint feed for the reception and transmission (not shown in FIG. 3).

Two antennas can be used if the TV data and/or the IP data come from two different satellites having different orbit positions. At the moment, the reception of microwave signals from two different frequency bands of one satellite by a single dish antenna 340 wherein the first band carries TV data and the second band carries IP data or vice versa also requires the application of two LNBs in the ODU 345 as the bandwidth of present LNBs is restricted to approximately 1 GHz. Presently, the arrangement of two LNBs in a single ODU 345 is a mechanically complex problem. As future generations of LNBs may have larger bandwidths, a single LNB may be sufficient for the detection of microwave signals from two or more frequency bands of a satellite.

The IDU 360 of the VSAT comprises both the indoor unit 150 of FIG. 1 and the IDU 260 of FIG. 2. Moreover, the IDU 360 does not convert digital TV data in a TV signal modulated on an IF or more modern to the baseband, but converts digital TV data in an IP data stream. Therefore, the IDU 360 of the VSAT outputs a single IP data stream 365 comprising the TV data of at least one TV channel and IP data from the Internet. Consequently, the indoor unit 360 of the VSAT is in the following called crossover box 360.

The IP data may also comprise voice data. Thus, it is an advantage of the crossover box 360 to provide in a single device using a single antenna 340 or using several antennas (not shown in FIG. 3) DTH TV reception, Internet broadband access and voice over IP (VoIP), and such triple play services.

The diagram 400 of FIG. 4 schematically illustrates a high level view of some functional blocks of the crossover box 360 of FIG. 3. The signal 404 at the first IF frequency containing a stream of digital data for a multitude of TV channels is directed to a first radio frequency (RF) front end 410 of the crossover box 400. Further, the signal 408 at the second IP frequency containing the stream of requested IP data is directed into a second RF front end 420. The output signal of the first RF front end 410 is processed by a processing unit 430. The processing unit 430 outputs a first outgoing IP data stream 445 of the digital TV data obtained from the first RF front end 410. Moreover, the processing unit 430 of the crossover box 400 converts the stream of IP data received from the second RF front end 420 in a second outgoing IP data stream 450. Finally, a switching unit 470 combines the first outgoing IP data stream 445 and the second outgoing IP data stream 450 in a joint outgoing IP data stream 480.

The receiver mentioned above comprises the LNB of the ODU 345 and the first RF front end 410 of the IDU or crossover box 400. The transceiver mentioned above comprises the LNB and the BUC of the ODU 345 and the second RF front end 420 of the IDU or crossover box 400.

In an alternative approach, when using two or more antennas directing to two or more satellites at different orbit positions, both antennas or all antennas can receive TV content from frequency bands of various satellites, can receive IP content from various antennas, and can transmit IP content to a specific antenna. The signals of the ODUs of the various antennas comprising both TV and IP data are feed in a crossover box. The crossover box separates the TV and IP data of the signals received from the ODUs of the various antennas. This configuration is not illustrated in FIGS. 3 and 4.

The diagram 500 of FIG. 5 shows an embodiment of the crossover box 400 of FIG. 4 in more detail. The first RF front end 510 is adapted to the capabilities of the LNB in the ODU 345 of the VSAT. For example, if the LNB is a quattro type, the first RF front end 510 receives the digital data of all TV channels contained in the transport streams of all four above mentioned frequencies bands. The first RF front end 510 comprises a tuner bank having a number of parallel tuners. The number of parallel tuners determines the number of transport streams from which the first RF front end 510 can select digital data, and it converts the selected digital data down to the baseband.

As an alternative to the application of a tuner bank or a highly integrated multi-tuner construction, a down-converter having a multi-carrier demodulator (MCD) can be applied. A Fast Fourier Transform (FFT) algorithm can also be used to demodulate several of many carriers in parallel.

In addition to the above outlined reception path, the second RF front end 520 additionally comprises a tuneable transmission radiator that can act as a return channel exciter for the uplink path. Moreover, the second RF front end 520 is also adjusted to the LNB and the BUC of the ODU 345 of the VSAT.

The block 538 comprises a 'multiple modems' block containing the circuitry which is necessary to demodulate the video coded and/or voice coded signals received from the second RF front end 520. On the other hand, the block 538 modulates the return channel information (the IP data which are transmitted by means of the second RF front end 520, the ODU 345 of the VSAT and the satellite 320 to a ground station having access to the Internet).

In addition to the 'multiple modems' block 534 containing the circuitry required to demodulate the DVB-S and DVB-S2 signals obtained from the first RF front end 510, the block 534 also comprises a Sat-IP or Sat>IP protocol which converts the DVB-S and DVB-S2 signals of the selected TV channel(s) in IP data. The Sat-IP protocol is a remote tuner protocol based on existing protocols such as Internet protocol (IP), universal plug and play (UPnP), real time streaming protocol (RTSP), hypertext transfer protocol (HTTP) complemented with extensions for satellite TV where necessary.

As briefly discussed in the context of FIG. 1, the indoor unit 150 of conventional satellite TV reception systems converts the received digital TV data to an IF for the distribution via dedicated coaxial cables and for demodulation by a set-top box. Alternatively, the indoor unit 150 converts the digital TV data in a baseband signal for the distribution via a HDMI cable and for demodulation by an IP TV set 170. Instead of providing digital TV data at an IF or in the baseband, the Sat-IP protocol converts TV data in an IP data stream, and thus eliminates the usage of specific coaxial cables or HDMI cables for the provision of TV data or TV programs within a house 390 or a building. This is one of the benefits of the crossover box 500. Additionally and more important, it enables all computer systems having an Internet access to present TV programs.

The baseband processing blocks 542 and 546 serve for user management and data management, signalling, image and sound decoding and encoding. Further blocks 542 and 546 exploit metadata and decrypt and encrypt data, if necessary. Moreover, they are adapted for a suitable protocol handling for entering and leaving the crossbar switch 574 on the IP protocol level. Finally, the block 542 generates and outputs the first outgoing IP data stream 555 and the baseband processing block 546 generates and outputs the second outgoing IP data stream 560. The functional blocks 534, 538, 542, 546 and 550 are one exemplary realisation of the processing unit 430 of FIG. 4. It is however possible to select a different segmentation of the functions realized in the processing unit 430. As already mentioned above, when using two or several antennas it may be beneficial to realize the various function of the crossover box in a configuration different from the one illustrated in FIG. 5.

The crossbar switch 574 combines the first 555 and the second outgoing IP data stream 560 in a joint outgoing IP data stream 580. Further, the crossbar switch 574 accepts at its output an incoming IP data stream by which users demand for selected content, i.e. a specific TV program and/or for access to a specific website of the Internet. Moreover, the crossbar 574 also provides a unified interface for the management of the integrated network, its contents, users and services.

Two processors 550 and 578 govern the essential functions of the crossover box 500. The central processing unit (CPU) 550 manages the function of the overall system 300. Furthermore, it controls a provisioning system of the overall system 300 (not shown in FIG. 5).

More in detail, the CPU 550 adjusts the basic function for the first RF front end 510, the second RF front end 520, the multiple modem blocks 534 and 538 as well as for the baseband processing blocks 542 and 546. In addition, the CPU 550 manages for example physical layer parameters such as the carrier symbol rate and the forward error correction (FEC) out of the information tables that the satellite provider transmits for the sake of bandwidth organisation.

The user interface processor 578 accepts commands of the connected users via a joint incoming IP data stream. The users are identified by their respective IP address. Further, the user interface processor 578 adjusts the data paths according to the services currently operated and/or requested. In addition, it also keeps contact with the CPU 550. The combination of a crossbar switch 574 and user interface processor is just one realization example of the switching unit 470 of FIG. 4. The switching unit 470 can also be implemented in various different ways.

Finally, the embodiment of a crossover box 500 illustrated in FIG. 5 comprises an IP hub interface 590. As it is illustrated in FIG. 4, the IP hub interface 590 is not part of the basic function of the crossover box 400; it is therefore represented as a dashed line in FIG. 5. FIG. 3 schematically depicts that a user at home may at the same time operate at least one TV set 370, a computer system 380, and at least one telephone (not shown in FIG. 3) with the crossover box 360 or 500. The IP hub interface 590 is a bridge between the crossbar switch 574 and the user(s) outside the crossover box 500. As already indicated above, the user(s) are identified by their IP address and the handling of their content resembles to them as if it was originating from a uniform IP network. This means, TV content or a TV program is presented as an IP data stream being transported by the IP protocol. Native IP content is presented like it is done via conventional routers.

FIG. 6 presents a flowchart illustrating the handling of requests for a TV program or of access to the Internet by the crossover box 400. The method begins at block 605 or block 620 when a user switches on a TV set 370 (block 607) or a computer system 380 (block 623). This step is an optional step as both the TV set 370 and the computer system 380 may already be in an operating state when the user starts his requesting action.

At step 610, the user selects a TV program by selecting a TV channel. As a consequence of this action, the TV set 370 or a respective set-top box generates an outgoing IP data stream which arrives as a joint incoming IP data stream at the output of the switching unit 470 at block 615. Analogously, the user requests content from a specific website at block 625. Similar to the selection of a TV channel, the computer system 380 creates an outgoing IP data stream which results in a joint incoming IP data stream at the output of the switching unit 470 again at block 615.

The switching unit 470 separates the joint incoming IP data streams at decision block 630 and directs the demand for a specific TV program as a first incoming IP data stream 445 at block 635 to the respective port of the processing unit 430 (which is the baseband processing block 542 in the embodiment of FIG. 5). Alternatively, decision block 630 directs the request for content from the selected website as a second incoming IP data stream 450 at block 660 to the respective port of the processing unit 430 (which is the baseband processing block 546 in the embodiment of FIG. 5).

At step 640, the processing unit 430 selects in cooperation with the first RF front end 410 digital data from for the selected TV channel from the plurality of TV channels obtained by the first RF front end 410 from the LNB of the ODU 345 of the VSAT. After demodulation of the digital data of the selected TV channel, it is decided at decision block 642 whether the digital data of the selected TV channel are encrypted. If this is the case, the encrypted digital data of the selected TV channel are decrypted at step 644. If the decryption is not allowed a message is created for the user by the generation of a first outgoing IP data stream indicating to the user that no permission for the reception of the selected TV channel or TV program presently exists. Decision block 642 and decryption block 644 are optional steps, and are therefore again indicated as dashed lines.

At step 645, the Sat-IP protocol converter is started and the digital data of the selected TV channel(s) are converted into IP data. Then, at step 650 the processing unit 430 (or the baseband processing unit 542 in the embodiment of FIG. 5) generates a first outgoing IP data stream 445 which is provided via the switching unit 470 as joint outgoing IP data stream 480 to the user demanding the TV program contained in the joint outgoing IP data stream 480 and the method ends at block 655.

The second incoming IP data stream created at block 660 causes the processing unit 430 to send by means of the second RF front end 420, the BUC and the transmission feed horn of the ODU 345 of the VSAT the request for content from the selected website via the satellite 120, 220 to the ground station having access to the Internet. At step 670, the processing unit 430 receives the requested data via the LNB of the ODU 345 of the VSAT and the second RF front end 420 and generates from this data at block 675 the second outgoing IP data stream 450. Similar to the first outgoing IP data stream 445, the switching unit 470 adds the second outgoing IP data stream 450 to the joint outgoing IP data stream 480 which provides it to the requesting user. Then, the method ends at block 680.

The embodiment of the crossover box 500 of FIG. 5 is individually installed at the customer premises and acts as a home gateway. The IP hub interface 590 provides at the same time access to the Internet for at least one computer system 380 and supplies an IP data stream containing at least one TV program as it is illustrated in FIG. 3. Furthermore, the crossover box 500 allows telephony via the VoIP standard, and thus enables triple play services via a single access point.

The crossover box 360, 500 simultaneously provides data for several computer systems and several TV sets used at the same time for example by the members of one family. The crossover box 360 is typically installed inside the house 390. This reduces the requirements for the electronics with respect to the operating temperature range. It is however also conceivable to design an outdoor variant of the crossover box 360, 500, for example by housing the electronics in a suitable container or shelter.

In FIG. 7, the IP hub interface 590 in FIG. 5 is replaced by a general distribution unit 790. The distribution unit 790 enables a flexible installation of the crossover box 700 of FIG. 7 within a network. By the insertion of the distribution unit 790 the transceiver system of FIG. 3 is extended to a hybrid transceiver and distribution system 700. In particular, the output of the distribution unit 790 can be handled like a backbone of a so-called last mile hub which serves many users with a high data rate internet access, many TV programs, and voice services via VoIP.

FIG. 8 shows crossover box 700 embedded in the context of an overall network. The transmission system comprises HD and SD satellite TV channels and satellite IP data channels for the transmission of Internet data and/or of voice data. As discussed in the context of FIGS. 1 to 3, the ODU 345 of the VSAT receives and transmits data via a satellite link 325, 330. The hybrid transceiver and distribution system of FIG. 8 generates by means of the Sat-IP protocol an IP data stream for the received TV data and combines these IP data with further IP data requested from the Internet in a single joint outgoing IP data stream 780. The distribution unit 790 of the hybrid system 700 of FIG. 7 provides the distribution of the outgoing IP data stream 780 and reception of an incoming IP data stream by various technologies. Both wired or fixed and wireless technologies can be used for the distribution of the joint outgoing IP data stream 780 and incoming IP data stream. Exemplary technologies for wirelessly bridging the last mile comprise Wireless Fidelity (WiFi), Wireless Interoperability of Microwave Access (WI-MAX), and Long Term Evolution (LTE). Wired or fixed transmission technologies comprise for example optical fibres, coaxial cables and twisted pair cables (like CAT-5) as examples for cables. Further, DSL (Digital Subscriber Line) variants are examples for bridging the last mile by means of a Digital Subscriber Line Access Multiplexer (DSLAM). The distribution unit 790 of the hybrid system of FIG. 8 can comprise one of these transmission technologies. It is also conceivable to combine two or several of the technologies depicted in FIG. 8 in the distribution unit 790 of the hybrid transceiver and distribution system 700 of FIG. 7. Furthermore, the list of technologies for the realization of a distribution unit 790 given in FIG. 8 is not exhaustive.

The transceiver system at the customer premises is adapted to the transmission technology used by the distribution unit 790 of the hybrid transceiver and distribution system 700 of FIG. 7. The IP data obtained from the distribution unit 790 are then provided to an IP home network similar to the network 365 of FIG. 3. By loading a respective Sat-IP client on any computer system, the computer system is able to display DTH TV programs. In parallel, the computer system can provide broadband Internet access.

FIG. 9 schematically illustrates the hybrid transceiver distribution unit 700 which acts as a multi-dwelling unit shared access gateway 910. In the multi-dwelling shared access scenario depicted in FIG. 9, triple play services may be distributed by means of a cable 915 as for example CAT-5 or a Satellite Master Antenna Television (SMATV). The end user may have access to the network by means of a standard DSL modem or by a cable modem 920. The cabling 365 after the modem 920 is similar as described during the discussion of FIG. 3. For this configuration the hybrid transceiver and distribution unit 700 may be set-up within the building 990.

As it is illustrated in FIG. 9, the hybrid transceiver distribution unit 900 acting as a multi-dwelling unit shared access gateway 910 is established outdoor in an outdoor container or shelter close the antenna 340. Alternatively the hybrid transceiver and distribution unit 700 can also be inserted in an indoor container or housing and can be set-up within the house 990, as for example in the basement of the house 990. Moreover, as already mentioned, the functionality of the crossover box components 710, 720, 730 and 770 may be adapted to the number of users simultaneously accessing the hybrid transceiver and distribution unit 700.

FIG. 10 schematically shows a hybrid transceiver and distribution system 1000 in which the distribution unit 790 comprises a DSLAM 1090. As indicated by the line 1010, in addition to the VoIP service via the crossover box 700, the DSLAM additionally allows a connection to the plain old telephone service (POTS). The DSLAM 1090 feeds the joint outgoing IP data stream 780 in a twisted pair copper cable 1020. The home DSL modem or DSL router 1030 re-establishes the IP data stream 780 and provides it to the IP TV set(s) 370 and computer system(s) of the user. In this configuration, the hybrid transceiver and distribution system 1000 can bridge a distance to the premises of the user of up to several km.

Moreover, a line card of a DSLAM can provide triple play services for a large number of users (e.g. 64 users for a specific technology of the line card). As a DSLAM can contain several or many line cards, a single DSLAM used as a distribution unit 700 in the hybrid transceiver and distribution 700 can provide triple play services to a small village.

FIGS. 9 and 10 just give exemplary realizations of a hybrid transceiver and distribution system 700. The application range of the crossover box 400 scans the entire range from the supply of a single user in a house to the provision of triple play services to users dispersed in a village.

The crossover box described above specifies a combined Sat-IP converter solution for the delivery of TV content with VSAT technology providing easy and immediate access to all existing DTH programming and simultaneously providing broadband Internet access delivered via satellite in a device outputting a single IP data stream. Thus, all Internet capable computer systems can play back TV programs.

The invention claimed is:

1. An apparatus for providing at least one joint outgoing IP data stream, the apparatus comprising:
   an indoor unit, comprising:
   a. at least one receiver configured to receive a stream of digital TV data, the stream simultaneously containing digital data of a plurality of TV channels;
   b. at least one transceiver configured to receive a downlink stream of IP data and to transmit an uplink stream of IP data via a satellite link, wherein the IP data relates to internet content;
   c. at least one processing unit configured to convert the digital TV data received from the receiver into a first outgoing IP data stream and to convert the IP data received from the transceiver via the satellite link into a second outgoing IP data stream, wherein the at least one processing unit is further configured to generate or modify the first outgoing IP data stream in response to a first incoming data stream requesting digital data of a selected TV channel, wherein the at least one processing unit is further configured to convert digital data of the selected TV channel into the first outgoing IP data stream by using a Sat-IP protocol, and wherein the Sat-IP protocol is a remote tuner protocol that converts digital video broadcasting satellite (DVB-S) and DVB-S2 signals of the selected TV channel into IP data; and
   d. at least one switching unit configured to combine the first outgoing IP data stream and the second outgoing IP data stream in at least one joint outgoing IP data stream, and wherein the at least one switching unit further splits a joint incoming IP data stream into the first incoming data stream comprising the data stream requesting digital data of a selected TV channel and a second incoming IP data stream comprising data requesting internet content.

2. The apparatus according to claim 1, wherein the first outgoing IP data stream comprises digital data of at least one TV channel.

3. The apparatus according to claim 1, wherein the processing unit is further configured to convert the second incoming IP data stream into IP data to be transmitted by the transceiver.

4. The apparatus according to 1, wherein the receiver further comprises a tuner bank configured to simultaneously select digital data of several selected TV channels from several transport streams comprising digital TV data.

5. The apparatus according to claim 1, wherein the stream of digital TV data comprises direct-to-home TV signals and the receiver comprises a low-noise block down-converter (LNB) and a first radio frequency front end, wherein the first radio frequency front end receives digital TV data from a low-noise block down-converter, and wherein the transceiver comprises a low-noise block down-converter, a block up-converter (BUC) and a second radio frequency front end, wherein the block up-converter transmits the uplink stream of IP data by a transmission feed horn.

6. The apparatus according to claim 1, wherein the receiver receives at least one first TV channel from a first antenna and at least one second TV channel from a second antenna, and the transceiver receives IP data from the first antenna or from the second antenna and transmits IP data via the first antenna or the second antenna.

7. The apparatus according to claim 1, wherein the receiver and the transceiver have a joint antenna with combined feeds for receiving digital TV and IP data and the transceiver has a separate feed for transmitting IP data.

8. The apparatus according to claim 1, further comprising a distribution unit configured to transmit the at least one joint outgoing IP data stream and to receive at least one joint incoming IP data stream by means of a wired link or by a wireless link.

9. The apparatus according to claim 8, wherein the wired link comprises twisted pair cables fed by a digital subscriber line access multiplexer, DSLAM, variant or a coaxial cable or an optical fiber, and wherein the wireless link comprises a wireless local area network, WLAN, operating according to one of the standards Wireless Fidelity, Wireless Interoperability of Microwave Access, or Long Term Evolution or a radio link.

10. A method for providing at least one joint outgoing IP data stream, the method comprising the steps:
   a. receiving a stream of digital TV data by at least one receiver, the stream simultaneously containing digital data of a plurality of TV channels;
   b. receiving a downlink stream of IP data and transmitting an uplink stream of IP data via a satellite link by at least one transceiver, wherein the IP data relates to internet content;
   c. converting the digital TV data received from the receiver into a first outgoing IP data stream by at least one processing unit, wherein converting the digital TV data comprises using a Sat-IP protocol, and wherein the Sat-IP protocol is a remote tuner protocol which converts digital video broadcasting satellite (DVB-S) and DVB-S2 signals of a selected TV channel into IP data, and converting the IP data received from the transceiver via the satellite link into a second outgoing IP data stream by the at least one processing unit; and
   d. combining the first outgoing IP data stream and the second outgoing IP data stream in at least one joint outgoing IP data stream and further splitting a joint incoming IP data stream in a first incoming data stream comprising a data stream requesting digital data of a selected TV channel and a second incoming IP data stream comprising data requesting internet content by at least one switching unit, wherein the at least one receiver, the at least one transceiver, the at least one processing unit, and the at least one switching unit are comprised within an indoor unit.

11. The method according to claim 10, further comprising the steps:
 a. requesting digital data of a selected digital TV channel by generating a joint incoming IP data stream;
 b. routing the joint incoming IP data stream as first incoming IP data stream to the processing unit by the switching unit;
 c. selecting digital data for the selected TV channel from the plurality of TV channels by the processing unit; and
 d. generating or modifying the first outgoing IP data stream comprising digital data of the selected TV channel by the processing unit.

12. The method according to claim 10, further comprising the steps:
 a. requesting digital data of a selected web site by generating a joint incoming IP data stream;
 b. routing the joint incoming IP data stream as second incoming IP data stream to the processing unit by the switching unit;
 c. routing the second incoming IP data stream by means of the transceiver to the web site; and
 d. generating or modifying the second outgoing IP data stream comprising requested digital data provided by the selected website by the processing unit.

* * * * *